April 12, 1960  P. M. LARSEN  2,932,727
TRAILER INTERIOR LIGHTING
Filed June 6, 1957

INVENTOR.
Peder M. Larsen
BY
Munn, Liddy, Daniels & March
ATTORNEYS

United States Patent Office 2,932,727
Patented Apr. 12, 1960

2,932,727

TRAILER INTERIOR LIGHTING

Peder M. Larsen, South Meriden, Conn.

Application June 6, 1957, Serial No. 664,002

4 Claims. (Cl. 240—7.1)

This invention relates to automobile trucks, trailers and the like, and more particularly to electric lighting means disposed within truck or trailer bodies of the type having large rear doors which are opened to provide access to the body from the rear.

An object of the present invention is to provide a novel and improved system or means of electric lighting within truck or trailer bodies of the type having large doors or openings at the rear thereof.

Another object of the invention is to provide an improved lighting means as above characterized, which may be advantageously operated from either the vehicle battery or from an external, commercial source of electricity.

A still further object of the invention is to provide an improved electric lighting means or system of the above type, having control means or switches which are readily accessible and operable by a person located either within the body or at the rear exterior thereof.

Yet another object of the invention is to provide an improved lighting system having all of the above features and advantages, which is nevertheless simple and economical in construction, and reliable in its operation.

A feature of the invention resides in the provision of an improved lighting system which provides abundant lighting yet which is so arranged and disposed as to occupy only small space readily available and not required as shipping space. Other features and advantages will hereinafter appear.

In the drawings accompanying this specification, similar characters of reference indicate corresponding parts wherever possible in the several views, in which.

Figure 1:
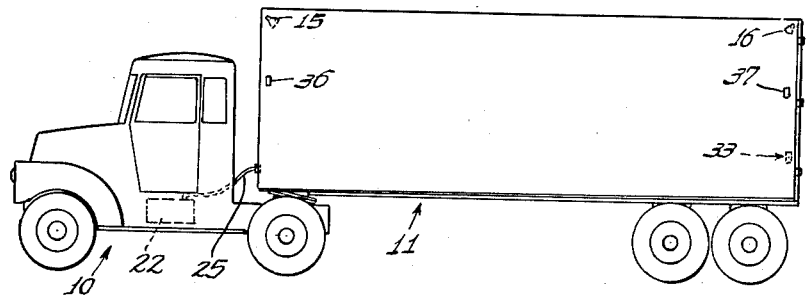
Figure 1 is a side elevational view of a trailer type of commercial vehicle, having the improved internal lighting system as provided by the invention.
Figure 2:
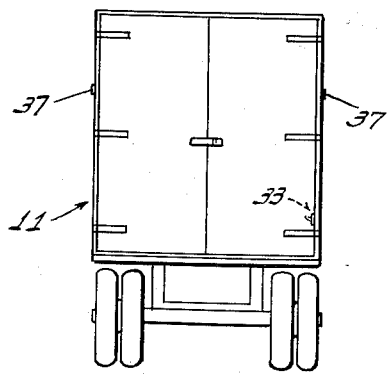
Fig. 2 is a rear view of the trailer of Fig. 1.
Figure 3:
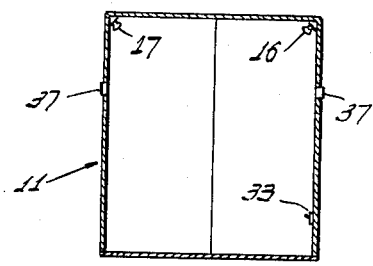
Fig. 3 is an inside view, looking out to the rear, of the trailer body.

Referring first to Figs. 1–3, there is shown a usual type of trailer truck having a tractor and cab 10, and a trailer body 11, the latter being provided with the usual large access opening at its rear, which may be closed by doors.

In accordance with this invention an improved and novel electric lighting system is provided in the trailer body 11, such system comprising a plurality of incandescent lamps 15, 16 and 17, the latter two being disposed at the rear, upper interior corners of the body. The lamp 15 may be disposed at the front of the body, preferably located at the ceiling thereof.

It often happens that trucks or trailers are loaded or unloaded at enclosed platforms, against which they are backed, and in such event natural light, as from daylight, is not adequate to provide sufficient illumination in the body interior, particularly at the foremost portions thereof. Moreover, when the trucks or trailers are being loaded or unloaded at nighttime, the exterior artificial illumination at the loading point is most always inadequate to provide sufficient light within the body 11. For such circumstances, the supplemental lighting provided by the lamps 15, 16 and 17 remedies the difficulty and supplies the degree of illumination necessary for quick and efficient handling of the merchandise or commodities being shipped.

Figure 4:
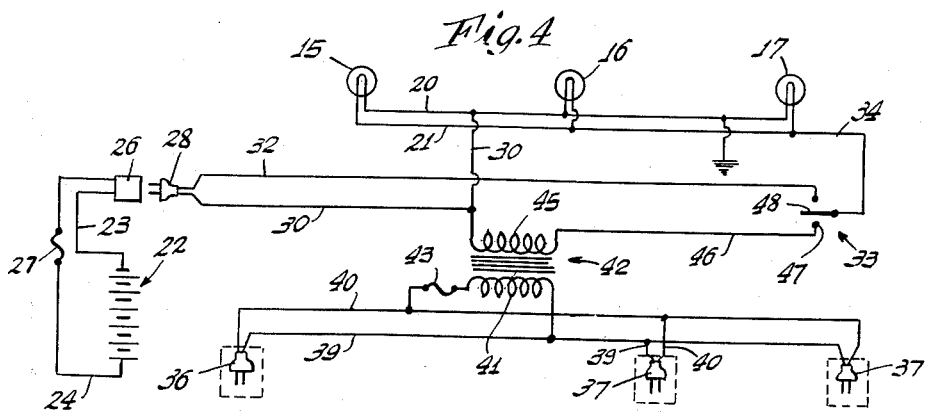
Fig. 4 is a schematic circuit diagram of the lighting system as provided by the invention.

Referring now to Fig. 4, in accordance with the present invention the lamps 15, 16 and 17 are shown as being joined in parallel by a supply line comprising wires 20 and 21, and provision is also made by which the lamps 15–17 may be supplied with energization from either the vehicle battery or an exterior commercial source of electricity, whichever may be desired by the operator. Moreover, convenient controls or switches are provided, which are accessible to a person located either within the truck body 11 or at the rear exterior thereof, to operate the lighting system.

In Fig. 4 the battery of the tractor 10 is indicated at 22, such battery having leads 23 and 24 constituting a cable 25 which is connected to a disconnect fitting 26, the hot lead 24 being shown as provided with a suitable type of fuse means 27.

Cooperable with the fitting 26 is a two-prong fitting 28 carried at the front exterior of the trailer body 11. From the fitting 28 a wire 30 is brought, connected with the line wire 20 of the lamps 15–17. A second wire 32 leads from the fitting 28 to a manually operable on-off switch 33 disposed at the rear of the trailer body 11 in a location where it may be readily reached by a person standing either outside of the body or within the body. From the switch 33 a wire 34 leads to the line wire 21 of the lamps 15–17. By this organization, energization of the lamps 15–17 may be readily effected from the vehicle battery 22, by merely closing the switch 33.

Further, in accordance with the invention, I provide for alternative energization of the lamps 15–17 from an external commercial source of electricity in a safe and convenient manner such that there is no possibility of damage occurring to the battery 22 from connection to the commercial source of supply if an operator should be thoughtless or careless in operating the lighting system. As shown, on the trailer body 11 I provide a plurality of connector fittings 36 and 37, one fitting 36 being located at the front of the body and two fittings 37 being disposed at the rear on either side thereof. The fittings 36 and 37 are of the type intended to cooperate with standard receptacles as found on 115-volt extension cords. The fittings 36 and 37 are connected with each other by wires 39 and 40, such wires being also joined to the primary 41 of a step-down transformer 42. As shown, in the primary circuit of the transformer 42 a safety fuse 43 is employed. The transformer 42 has a secondary coil 45 one terminal of which is joined to the wire 30. The other terminal of the secondary coil 45 is joined by means of a wire 46, to a switch contact 47 adapted to be engaged by the blade 48 of the switch 33, such blade being connected with the wire 34.

By this invention the switch 33 is made to be of the single-pole double-throw type, whereby a simple and effective safety feature is provided in my lighting system. For, it will be seen that the switch 33 may have an "off" position as indicated, or may connect either the battery 22 or the transformer 42 to the lamps 15–17. But, under no circumstances could the switch 33 connect both the battery 22 and the transformer 42 to the lamps 15–17 simultaneously, whereby alternating current would be applied to the battery to cause damage thereto, and cause short-circuiting of the circuit of the lighting system.

The lamps 15–17 may be of the small 6 or 12 volt sealed beam floodlight type, or they may have separate reflectors, if desired. By virtue of the corner mounting of the lamps 16 and 17 these are located well out of the way, which is an important feature of the invention.

It will be understood that an operator may conveniently control the lighting system from the rear of the truck body 11, either standing outside of the body or inside the same, by merely actuating the switch 33. Also, where a commercial source of electricity is not available, the lighting system may be energized from the tractor battery 22 through the cable 25. Or, if commercial current is available from an extension cord, such cord may be connected to either of the fittings 36, 37 for the purpose of supplying energy to the lamps 15–17 in lieu of the battery 22, thus preventing unnecessary discharge of the battery.

The fittings 36 and 37 may be of an improved weather-proof type suitable for outdoor use, such fittings being readily available in the present market. The transformer 42 need be of only small rating and size, whereby it is positionable in any out of the way space within the body 11.

My improved lighting system as above set forth is seen to be simple and economical to fabricate, and to provide effective and reliable lighting for dark interiors of trucks, trailers and the like. Advantageous safety factors are had by the provision of the fuses 27 and 43; by virtue of the alternative-type of control switch 33 it is impossible, through carelessness or inadvertence on the part of an operator, to effect a short circuit or cause damage because of the two sources of supply for the lamps 15–17.

Variations and modifications may be made within the scope of the claims, and portions of the improvements may be used without others.

I claim:

1. In combination, a commercial vehicle body of generally rectangular configuration, adapted to hold articles for shipping; incandescent low-voltage lighting means disposed within the upper rear corners of said body; low-voltage circuit means connected with said lighting means, to carry current thereto; a low-voltage current-supply circuit for connection with the battery of the vehicle; a second and high-voltage current-supply circuit including a voltage-reducing transformer and a low-voltage output circuit adapted to provide a low voltage suitable to energize said low-voltage lighting means from an external high-voltage commercial source, said low-voltage output circuit being isolated from the high-voltage current-supply circuit; a male connector fitting disposed at the exterior of the body on one side thereof, connected with said last-named high-voltage current-supply circuit for effecting a connection thereto from a high-voltage electrical extension line; and solely one manually-operable control, to control the illumination of the lighting means, said control consisting of a selectively and manually operable switch means connected to said first-mentioned low-voltage circuit means and to said low-voltage output circuit for switching either one or the other of said low-voltage circuits to said lighting means, to cause energization of the latter.

2. The invention as defined in claim 1, in which the switch means comprises a single-pole double-throw switch.

3. The invention as defined in claim 1, in which the lighting means comprises a pair of parallel-connected lamps, one lamp being in each upper, rear corner of the body.

4. The invention as defined in claim 1, in which the lighting means comprises a pair of parallel-connected lamps, one lamp being in each upper, rear corner of the body, and comprises an additional parallel-connected lamp disposed at an upper front corner of the body.

References Cited in the file of this patent

UNITED STATES PATENTS

| | | |
|---|---|---|
| 1,968,361 | Tyler | July 31, 1934 |
| 2,069,238 | Fraser | Feb. 2, 1937 |
| 2,230,458 | Hummert | Feb. 4, 1941 |
| 2,750,490 | McGoldrick | June 12, 1956 |
| 2,818,498 | Foch | Dec. 31, 1957 |

OTHER REFERENCES

Exide Lightguard (advertising pamphlet).